Aug. 6, 1935.  C. PISSIS  2,010,374

SAFETY LIGHT FOR AUTOMOBILES

Filed March 15, 1932

INVENTOR.
Cora Pissis
BY Joseph B. Gardner
ATTORNEYS.

Patented Aug. 6, 1935

2,010,374

UNITED STATES PATENT OFFICE 2,010,374

SAFETY LIGHT FOR AUTOMOBILES

Cora Pissis, San Francisco, Calif.

Application March 15, 1932, Serial No. 598,930

1 Claim. (Cl. 240—8.26)

The invention relates to an illuminating device designed to be carried on an automobile so that the position of the latter with reference to the road will be clearly indicated at night and in inclement weather.

An object of the invention is to provide a simple device of the character described which will illuminate portions of the automobile and the roadway thereunder and at the side thereof whereby the exact position of the automobile with respect to the roadway will be plainly indicated to the driver of the automobile carrying the device as well as to a driver of an approaching automobile.

Another object of the invention is to provide a device of the character described which will not only afford the advantages aforesaid, but will serve as a beacon which will be visible from the side as well as the front of the automobile at both close and long range.

A further object is to provide a device of the character described which is inexpensive in construction, may be easily secured in position, permits of the ready replacement of parts without requiring the detachment of the device from the automobile, is easily kept clean, and does not require any attention on the part of the driver.

The invention possesses other objects and features of advantage, some of which, with the foregoing, will be set forth in the following description of the preferred forms of the invention which are illustrated in the drawing accompanying and forming part of the specification. It is to be understood, however, that variations in the showing made by the said drawings and description may be adopted within the scope of the invention as set forth in the claim.

Referring to said drawing.

Figure 1:
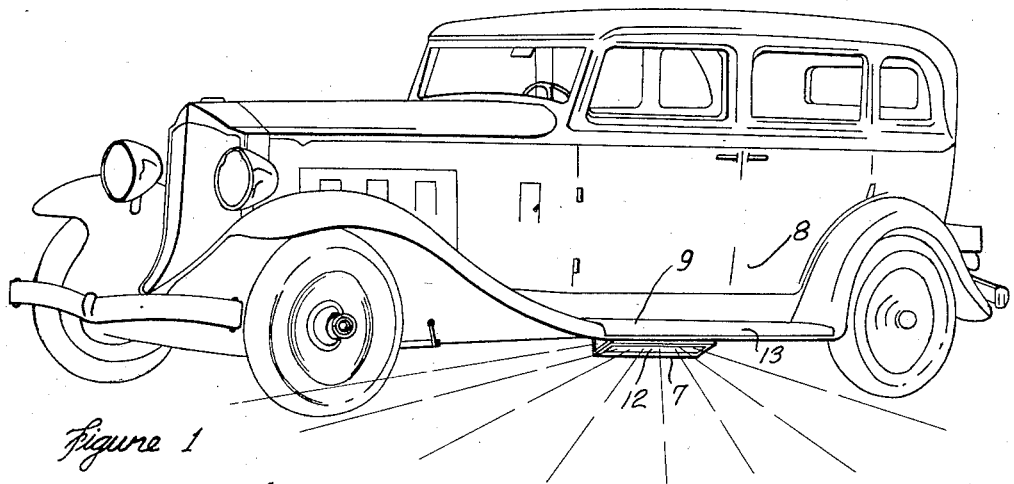
Figure 1 is a perspective of an automobile equipped with the device of my invention.
Figure 3:
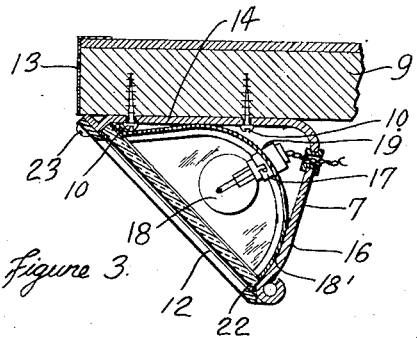
Figure 3 is a vertical transverse sectional view of the device.
Figure 2:
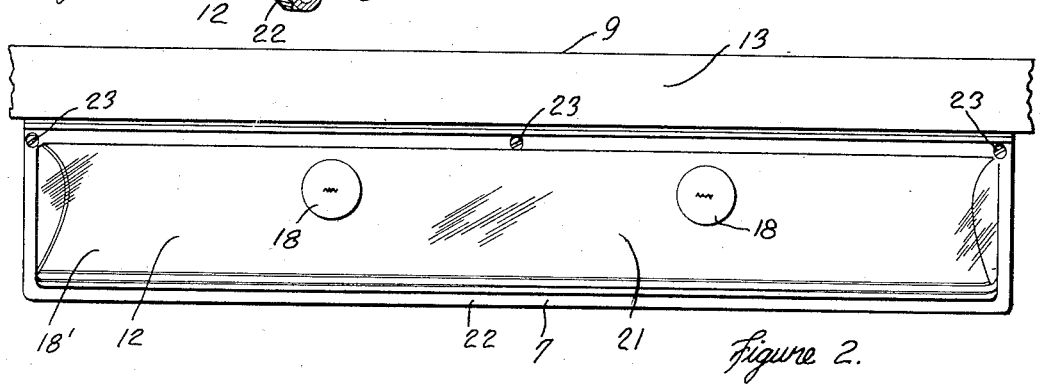
Figure 2 is a side view of the device on a larger scale.

In the embodiment of my invention illustrated in Figures 1 to 3 of the drawing, the device comprises an elongated lamp housing 7 in which is contained practically all of the parts of the device and which is arranged to be secured to the automobile 8 under one of the fenders or running boards 9 thereof. Ordinarily the device is arranged to be positioned under the running board at the left hand side of the automobile and to extend therealong with the light opening 12 of the housing preferably parallel to and just inwardly of the outer edge 13 of the board. The opening 12 preferably extends for the full length of the housing and the latter is desirably of considerable length so that an opening of about 20 inches is available. The housing is designed to be held immediately under the board and while the housing is as above stated quite long, its height on the other hand is relatively small so that it projects downwardly from the board a minimum extent and therefore does not appreciably impair the road clearance of the car body. Attachment of the housing to the board may be by means of screws 10 extending through the upper side of the housing.

The housing is preferably formed with but a top wall 14 and rear wall 16 so that the opening 12 which is formed between the forward edge of the top wall and the lower edge of the rear wall is obliquely disposed. Positioned in the housing is an electric-bulb socket member 17 carrying a lamp bulb 18 and arranged for suitable connection with an electric battery or other source of current on the automobile. Owing to the position of the bulb and the relation and form of the opening, the direct rays from the light will be directed downwardly under the automobile and outwardly toward the side thereof. Within the housing is also a reflector 18' which extends the full length of the opening 12 and is so designed that the rays from the lamp directed thereon will for the most part be reflected outwardly through the opening in substantially the same manner as the direct rays. A suitable opening 19 is provided in the reflector for the socket member 17.

The opening 12 is preferably covered with a glass plate or lens 21, and the latter is as here shown mounted in a frame 22 which is hingedly connected to the lower edge of the rear wall 16. Suitable screws 23 or other fastening means are employed for holding the top of the frame in position against the forward edge of the top wall 14. In this manner the frame and glass will be effectively retained in closed position, yet at the same time they may be readily moved to open position to permit access to the interior of the housing. Preferably the reflector is of such form and size that its forward edges will bear against the plate 21 and thereby resiliently retain the latter against any vibration when in closed position.

In addition to the opening 12, one or both of the end walls of the casing are formed of glass so that light rays from the lamp may be directed upon the adjacent wheels of the automobile. It will now be clear that when the device is illuminated, such as at night or in inclement weather, a concentrated mass of light will be projected on the roadway both under the automobile and adjacent the side thereof and against the wheels of the automobile at the same side. In this way the driver of said automobile, as well as a driver of an approaching vehicle, will have clearly designated to each of them the exact position of the automobile with reference to the roadway, both when the automobile is stationary as well as in motion. As a result of the foregoing, collisions and side-swiping may be prevented and increased safety in driving will be assured.

Figure 4:
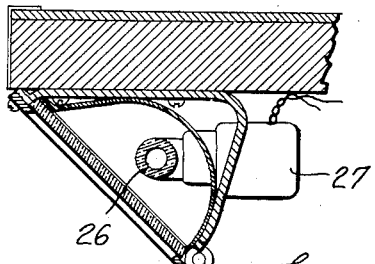
Figure 4 is a view similar to Figure 3, but showing a slightly modified form of the source of illumination.

While I have here shown two lamps in the housing, it will be obvious that the number of lamps used may be changed, or the form of the lamps changed. For instance, if desired, a lamp 26 of the neon gas type with transformer 27 may be employed as shown in Figure 4.

Figure 5:
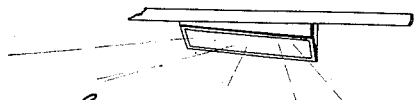
Figure 5 is a side view of the device in a modified form.

Owing to the fact that the light or the reflector in the housing is visible from the open end thereof, as well as from the opening 12, the device of my invention also serves as a beacon since a person approaching the automobile from the front or side will readily see such light at either long or short range. If desired as shown in Figure 5, the housing may be inclined so that the rear end will project further downwardly from the running board and thus increase the visibility of the light from the front and side of the automobile. It will thus be seen that the device of my invention is well adapted to the accomplishment of all of the objects hereinbefore referred to.

I claim:

In a safety device of the character described, a light source, a housing therefor arranged to be positioned on an automobile under the running board thereof and having a front opening portion through which the rays from said light are projected on the roadway under the automobile and at the side thereof, and an end opening portion through which rays from said light are projected against a wheel of the automobile to illuminate same at the same time the road is illuminated as aforesaid, said first and second opening portions being respectively visible from the side and front of the automobile, said housing comprising a casing having a portion thereof disposed for attachment to the under side of the running board and a second portion depending from said first portion, and a transparent cover hingedly mounted on said second portion and detachably secured to said first portion.

CORA PISSIS.